(12) United States Patent
Van Luyt

(10) Patent No.: US 6,177,960 B1
(45) Date of Patent: Jan. 23, 2001

(54) TV SIGNAL RECEIVER

(75) Inventor: Balthasar A. G. Van Luyt, Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/171,090

(22) PCT Filed: Feb. 12, 1998

(86) PCT No.: PCT/IB98/00172

§ 371 Date: Oct. 13, 1998

§ 102(e) Date: Oct. 13, 1998

(87) PCT Pub. No.: WO98/36563

PCT Pub. Date: Aug. 20, 1998

(30) Foreign Application Priority Data

Feb. 14, 1997 (EP) .................................................. 97200418

(51) Int. Cl.[7] .................................................. H04N 5/44
(52) U.S. Cl. .................................. 348/553; 9/460; 9/725
(58) Field of Search .................................. 348/9, 10, 460, 348/563, 907, 553, 725, 12, 13; H04N 5/44

(56) References Cited

U.S. PATENT DOCUMENTS

| | | | |
|---|---|---|---|
| 4,230,990 | * 10/1980 | Lert, Jr. et al. | 455/4.1 |
| 5,155,591 | * 10/1992 | Wachob | 348/9 |
| 5,389,964 | * 2/1995 | Oberle et al. | 348/9 |
| 5,424,770 | * 6/1995 | Schmelzer et al. | 348/9 |
| 5,508,731 | * 4/1996 | Kohorn | 348/12 |
| 5,600,366 | * 2/1997 | Schulman | 348/9 |
| 5,652,615 | * 7/1997 | Bryant et al. | 348/9 |
| 5,761,601 | * 6/1998 | Nemirofsky et al. | 455/3.1 |
| 5,815,671 | * 9/1998 | Morrison | 395/200.77 |
| 5,822,018 | * 10/1998 | Farmer . | |

* cited by examiner

Primary Examiner—Jeffrey Brier
Assistant Examiner—Wesner Sajous
(74) Attorney, Agent, or Firm—Leroy Eason

(57) ABSTRACT

A TV signal receiver has a tuner for deriving a first TV signal from the input signal, and a device for storing in a memory and reading therefrom a plurality of blocks of a second TV signal derived from the input signal. The first TV signal has interruptions during which a block of the second TV signal is insertable so as to obtain a composite TV signal which is supplied at an output terminal of the receiver.

14 Claims, 5 Drawing Sheets

TV SIGNAL RECEIVER

BACKGROUND OF THE INVENTION

The invention relates to a TV signal receiver. Generally, TV programs of a given length are regularly interrupted by, for example commercials or other information. Such messages are usually concentrated in a standard packet which is sent to everyone. Many viewers regard at least a pat of such a packet as being useless, for they prefer information about other subjects such a s, for example stock exchange news or the weather forecast instead of commercials, or they p refer, for example commercials about products in which they are specially interested.

SUMMARY OF THE INVENTION

It is an object of the present invention to provide a TV signal receiver with which it is possible to adapt the contents of second TV signal blocks referred to as information signals, which do not form part of the first TV signal, for example a movie, and become available at the output terminal of the TV signal receiver.

To this end, the TV signal receiver according to the invention has an input terminal for receiving an input signal, a tuner for deriving a first TV signal from the input signal, and memory controlled by control means for storing therein and reading therefrom a plurality of blocks of a second TV signal derived from the input signal. The first TV signal has interruption intervals during eachof which a block of the second TV signal is ensertable, the interruption intervals being provided with a first control signal for controlling the memory in such a way that at least one block of the second TV signal block is read from the memory for insertion into an interruption interval in the first TV signal so as to obtain a composite TV signal. The receiver has an output terminal at which the composite TV signal is supplied.

In this way, second TV signal blocks which do not form part of the first TV signal, referred to as the main signal, can be selectively added to the main signal via the signal receiver. These second TV signal blocks are stored in a memory in the receiver from which they are read again at the moment when there is an interruption in the main signal. This is effected in response to a first control signal comprising information about the positions of the interruptions. For example, the first control signals may precede the interruptions in the input signal. They may also be present, for example at the start of the interruptions. The second TV signal blocks are linked with a second control signal. Said second control signal has to activate the memory controller in time so that the second TV signal blocks can be stored when they arrive. The first and the second control signals are detected by the memory controller, which may, for example, comprise one or more detectors or may consist of a control system unit.

The TV signal receiver is switchable between two modes. In the first mode, second TV signal blocks are read from the memory and inserted into the interruptions in the first signal. In the second mode, the second TV signal blocks received at the input terminal are stored in the memory where they constitute an assortment of second TV signal blocks. In both cases, use is made of a control signal which ensures that the second TV signal blocks are inserted or stored at the suitable moment.

Moreover, the TV signal receiver may be provided with input means with which a profile of second TV signal blocks of the desired contents can be selected. Such a selection may take place before the second TV signal blocks are sent to the receiver. In that case, a signal supplied from an output terminal of the signal receiver is sent with the relevant information to the broadcaster or service provider which subsequently only sends the desired second TV signal blocks and, based on a control signal, switches the TV signal receiver to the second mode so that the second TV signal blocks can be stored in the memory.

Instead of the user making his choice via the input means, the broadcaster or service provider may monitor the content of the second TV signal blocks himself. To this end, the broadcaster or service provider may determine the preferential profile based on the situation of the user. Elements such as the age of the user and his purchasing behavior during a certain period may play an important role.

If the relevant information remains stored and if this information is not sent to the broadcaster or service provider, the broadcaster or service provider may send a full packet of second TV signals to the device and store them in the memory. In this case, the selection is made known to the memory so that only second TV signal blocks having the desired contents are retrieved from the memory by means of a selector and inserted into the interruptions.

The selection may take place before the information packets are stored in the memory. Then, the memory will only comprise the information of which the content meets the preferential profile. In this way a smaller memory would suffice.

Further, it is proposed to make the same second TV signal blocks frequently insertable, so that the user has the opportunity to watch the same message more than once.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENTS

Figure 1A:
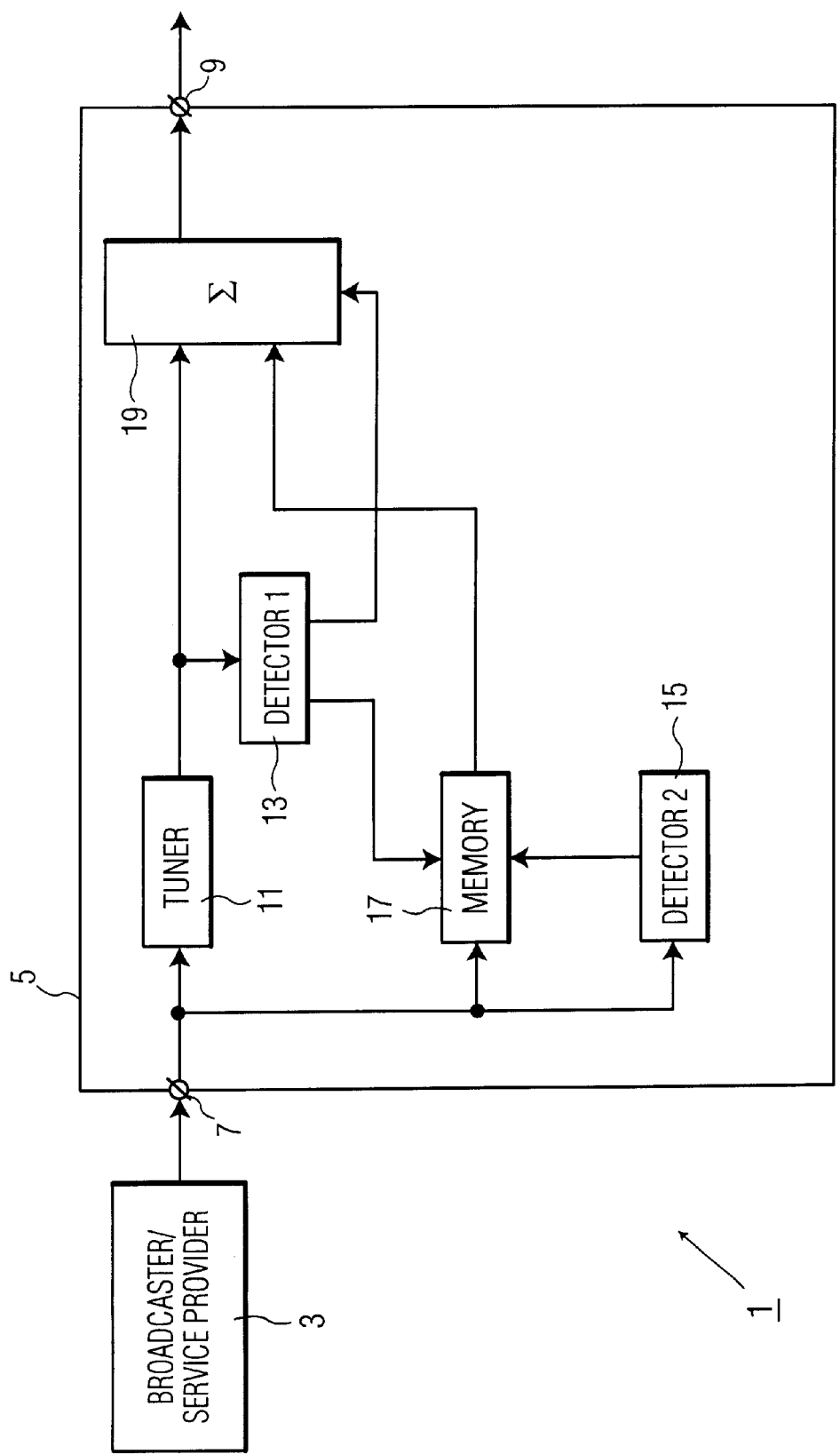
FIG. 1(*a*) and 1(*b*) show a first and a second embodiment of a system provided with a broadcaster or service provider and at least one TV signal receiver according to the invention.

FIG. 1(*a*) shows diagrammatically a system 1 comprising a broadcaster or service provider 3 and a TV signal receiver 5. In practice, more than one TV signal receiver will be connected to the broadcaster or service provider 3. The TV signal receiver 5 has an input terminal 7 and an output terminal 9. The TV signals transmitted by the broadcaster or service provider 3 are received at the input terminal 7 of the TV signal receiver 5. This will be further referred to as the input signal. The input signal may be split up into two different types of signals. The first type relates to the first TV signals, in other words, the main programs. These first TV signals have interruption intervals. The second type relates to the second TV signal blocks comprising information such as commercials, stock exchange news, the weather forecast, or commercials on given subjects, etc. The contents of such information are, however, often considered to be too diverse by the user who wishes to receive, for example only information about given subjects. It is an object of the invention to provide a solution in this respect.

The input signal received at the input terminal 7 is applied to a tuner 11 so that a particular first TV signal is selected from the input signal. The receiver includes detection mean which may comprise two detectors 13, 15. Each of the first TV signals has a first control signal with which the position of the interruptions is indicated. This control signal is analyzed by the first detector 13, which is arranged following the tuner 11.

The input signal may also comprise one or more second TV signal blocks. The second TV signal blocks are linked with a second control signal which is detected by the second detector 15. When the detector 15 detects such a control signal, it will activate a memory 17 in such a way that the second TV signal blocks will be stored in this memory.

When the first detector 13 signalizes occurance of an interruption in the first TV signal selected by the tuner I1, this detector will subsequently activate the memory 17. The memory 17 will send one or more of the stored second TV signal blocks to a signal-combining unit 19 which also receives the first TV signal selected by the tuner 11. The first detector 13 not only activates the memory on the basis of the first control signal but also the signal-combining unit 19. In response to the first control signal, the second TV signal blocks are inserted into the interruptions in the first TV signal at the appropriate moment in the signal-combining unit, so that a composite TV signal is obtained. The composite TV signal is subsequently produced at the output terminal 9 of the receiver.

Figure 1B:
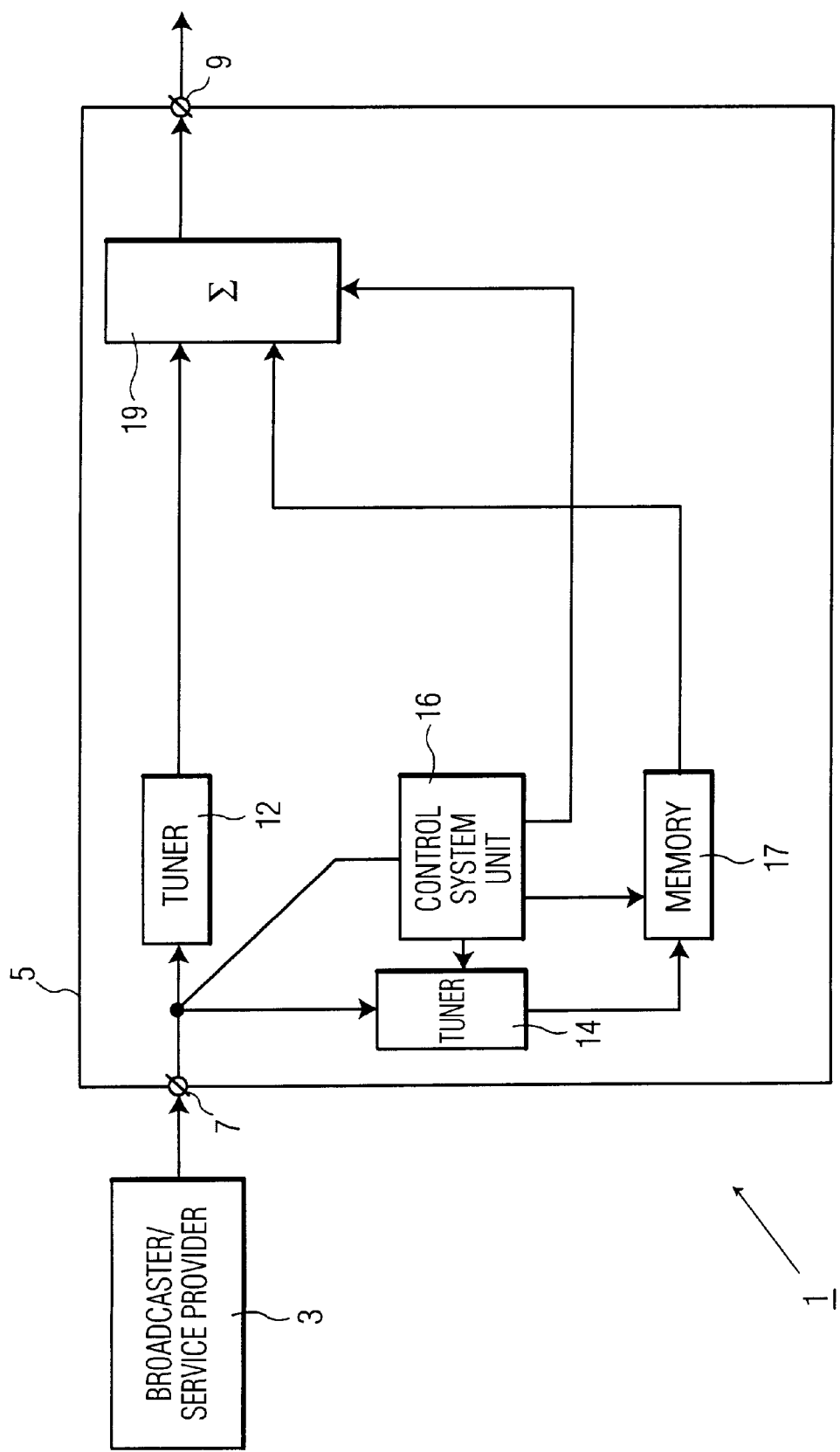

FIG. 1(b) shows another embodiment of the TV signal receiver according to the present invention. The tuner 11 and the first and the second detector 13, 15 are here replaced by a first and a second tuner 12, 14 and a system control unit 16 constituting the detection means. The input signal received at the input terminal 7 is applied to a first tuner 12, so that a first TV signal is selected from the presented first TV signals. The input signal is also applied to a second tuner 14, so that the second TV signal blocks can be selected from the input signal. The second tuner 14 may be system controlled and decodes incoming messages before sending them to the memory. The first control signal which indicates the interruptions in the first TV signal and the second control signal which is linked with the second TV signal blocks are detected by the control system unit 16. Said control unit 16 activates the memory in reaction to the second control signal, so that the second TV signal blocks can be stored when they arrive. In reaction to the first control signal indicating an interruption in the first TV signal, the memory is activated by the system control unit so that a second TV signal block will be sent from the memory to the signal-combining unit 19 to inserted in an interruption. For that purpose, the system control unit 16 also activates the signal-combining unit 19.

The receiver is thus switchable between two modes. In the first mode, one or more second TV signal blocks are read from the memory and inserted into an interruption in the first TV signal. This is effected on the basis of the first control signal with which the interruptions are provided and with which the memory is activated so as to release stored second TV signal blocks. In the second mode, based on the second control signals, one or more second TV signal blocks are stored in the memory so that they can be inserted into the first TV signal at a later stage during possible interruptions.

The second TV signal blocks may be sent to the TV signal receiver at any moment because they can be stored in a memory anyway and can be retrieved at a later stage when there are interruptions in the first signal.

Figure 2:
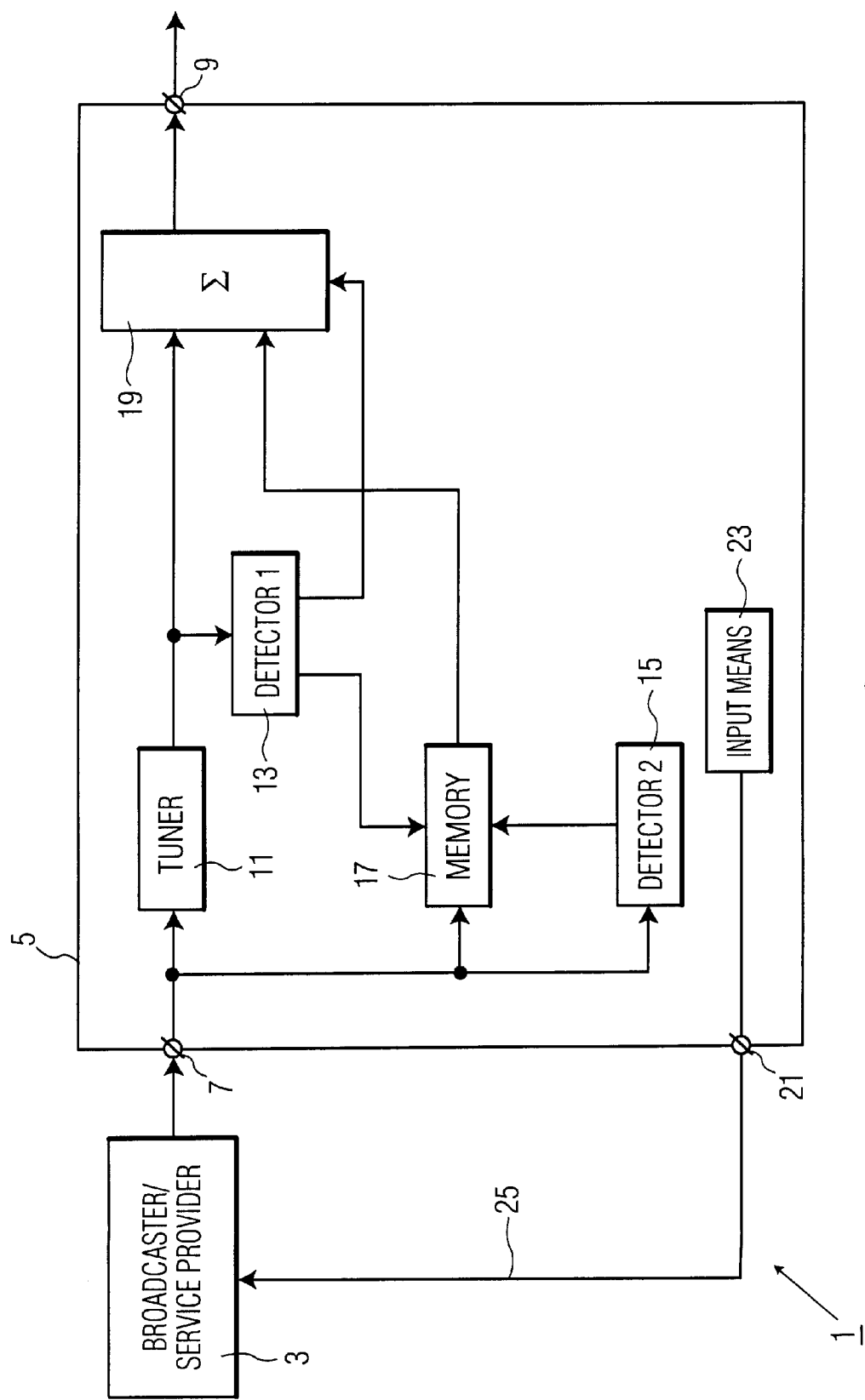
FIG. 2 shows a third embodiment of a system provided with a broadcaster or service provider and at least one TV signal receiver according to the invention, in which a profile of desired second TV signal blocks is made known to the broadcaster or service provider.

The TV signal receiver 5 is preferably provided as in FIG. 2 with input means 23 for presenting a preferential profile of themes or subjects about which information is desired. However, this profile may be presented in different manners.

FIG. 2 shows an embodiment in which another possibility of supplying a preferential profile is illustrated. The profile is supplied from an output terminal 21 of the TV signal receiver 5. Moreover, feedback means 25 may be provided, ensuring that the signal supplied from this output terminal 21 is sent to the broadcaster or service provider 3 so that the broadcaster or service provider can send packets of second TV signal blocks with the desired profile to the TV signal receiver 5.

Figure 3:
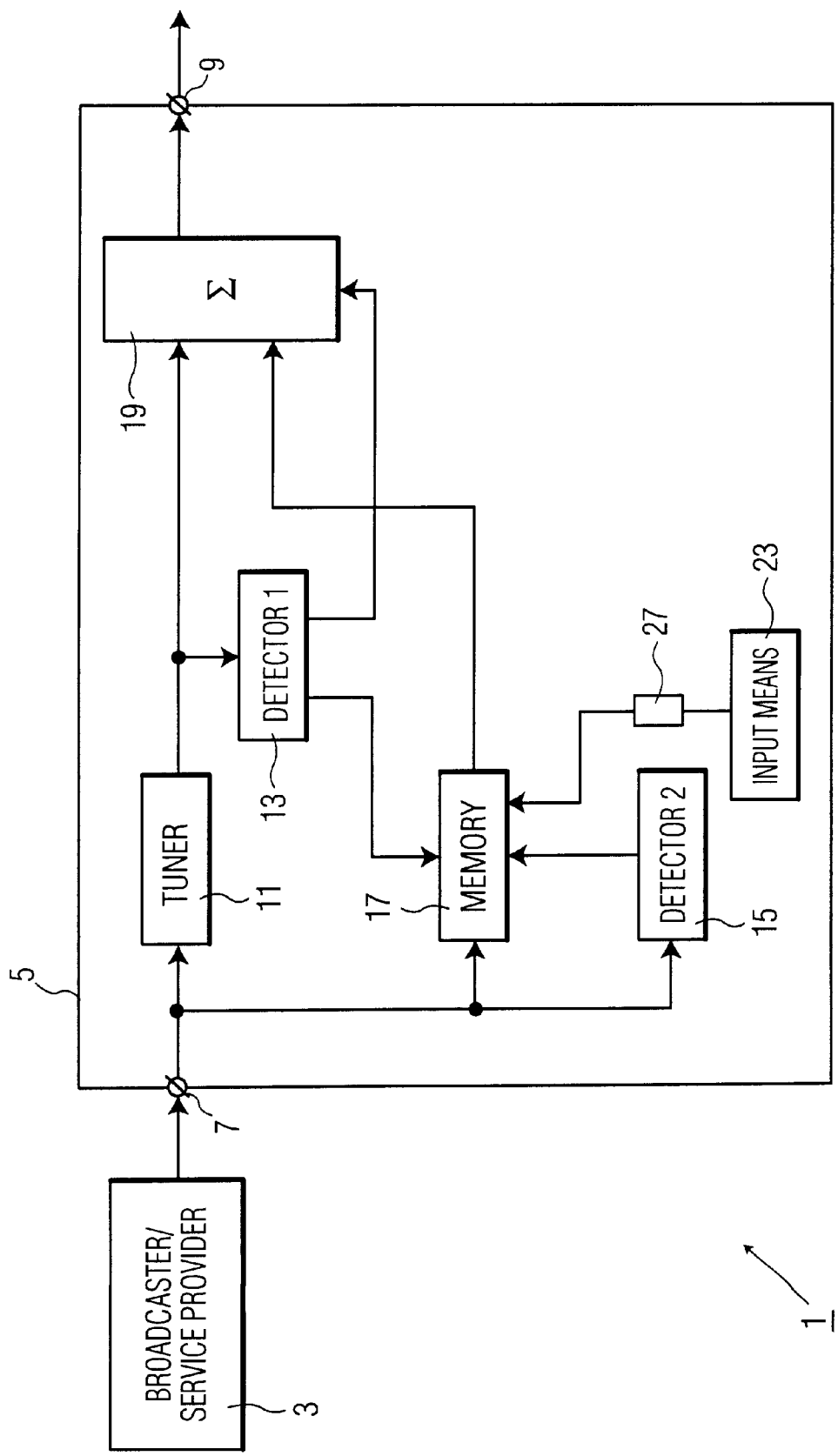
FIG. 3 shows a fourth embodiment of a system provided with a broadcaster or service provider and at least one TV signal receiver according to the invention, in which the preferential profile of second TV signal blocks is presented to the memory in the receiver.

FIG. 3 shows an embodiment in which a second possibility of presenting a preferential profile is illustrated. The memory 17 may comprise, for example, the full information packet of second TV signal blocks transmitted by the broadcaster or service provider 3 and the desired profile is passed on to the memory 17 with the aid of the input means 23. To this end, the input means 23 are connected to the memory 17 via a selector 27. When the memory 17 is activated by the first detector 13 on the basis of the first control signal with which the interruptions are provided, only second TV signal blocks selected via the selector 27 will be released by the memory 17 in dependence upon the preferential profile and inserted into the interruptions in the first TV signal.

The memory 17 may also contain only those information packets of which the content corresponds to the preferential profile of the user. The information added to the memory then consists of the preferential profile. All additional information comprised in the second TV signal blocks will not be stored. In this case, the preferential profile has to be entered before the information packets are added to the memory. The indication of the preferential profile acts a as filter for the information to be stored in the memory. Consequently, a smaller memory suffices.

Instead of the user making his choice via the input means 23, the broadcaster or service provider 3 may monitor the content of the second TV signal blocks himself. To this end, the broadcaster or service provider 3 may determine the preferential profile based on the situation of the user. Elements such as the age of the user and his purchasing behavior during a certain period may play an important role.

In both FIGS. 2 and 3, the input means 23 may consist of, for example a keyboard.

It is remarked that in FIGS. 2 and 3, the tuner 11 and the detectors 13 and 15 can be substituted by a first and a second tuner 12, 14 and a system control unit 16, in analogy with figure 1(b).

Figure 4:
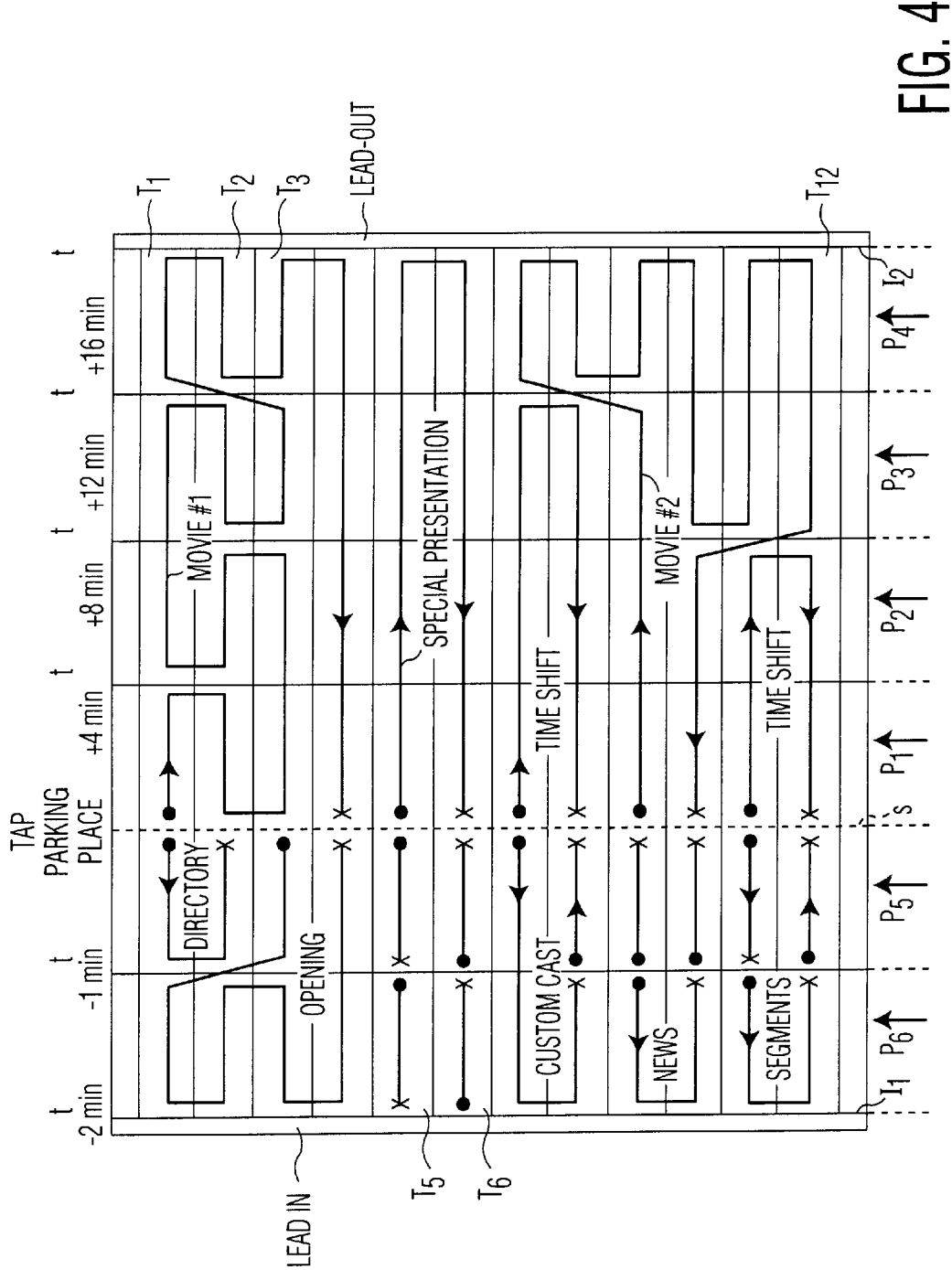
FIG. 4 is an example of recording second TV signal blocks on a longitudinal recording medium.

The memory 17 may be implemented in different manners. The memory may be, for example a solid-state memory but also a magnetic record carrier. Examples of a magnetic record carrier are a hard disk or a longitudinal magnetic recording medium. An example of a longitudinal magnetic recording medium is described in the non-prepublished European patent application 96202074.9 (PHN 15.902) in the name of the applicant and is herein incorporated by reference. FIG. 4 shows an embodiment of the recording medium described in said application. The previously filed application already describes how a user can state his wishes with regard to information specially intended for him by making use of a menu. The subjects may be given a priority, thus providing a sequence for the second TV signal blocks to be inserted into the interruptions at a later stage.

When the TV signal receiver is switched to the second mode, the second signal blocks may be recorded, for example in the parts $P_5$ and $P_6$ of the tracks $T_5$ and $T_6$ on the record carrier. If necessary, more second TV signal blocks may of course be recorded in the parts $P_5$ and $P_6$ of the tracks. Position information about the position of the second TV signal blocks on the record carrier is stored in the directory which is recorded in the part $P_5$ of the tracks $T_1$ and $T_2$ so that the second TV signal blocks can be retrieved if an interruption in a received first TV signal is to be filled up.

As the content of the second TV signal blocks is tuned to the personal choice of a user, there is a better chance that the user wants to see the same message more than once. Therefore, the second TV signal blocks are frequently insertable.

What is claimed is:

1. A TV signal receiver comprising:

an input terminal for receiving an input signal;

a tuner coupled to the input terminal for deriving a first TV signal from the input signal;

a memory controlled by control means for storing therein and reading therefrom a plurality of blocks of a second TV signal also included in the input signal;

said first TV signal having interruption intervals during which at least one block of said second TV signal is insertable therein, the interruption intervals being accompanied by a first control signal for causing said memory control means to read at least one block of the second TV signal from the memory for insertion into an interruption interval of the first TV signal;

a signal-combining unit responsive to the first control signal to insert said block of the second TV signal into said interruption interval in the first control signal, to thereby obtain a composite TV signal; and an output terminal at which said composite TV signal is supplied.

2. A TV signal receiver as claimed in claim 1, further comprising detection means for deriving the first control signal from the first TV signal.

3. A TV signal receiver as claimed in claim 1, which is switchable between a first mode in which at least one second TV signal block which is stored in the memory is inserted into an interruption interval in the first TV signal under the control of the first control signal, and a second mode in which blocks of the second TV signal are stored in the memory under the control of a second control signal.

4. A TV signal receiver as claimed in claim 3, further comprising detection means for deriving the second control signal from the input signal.

5. A TV signal receiver as claimed in claim 1, further comprising input means for presenting a preferential profile of themes for the second TV signal blocks.

6. A TV signal receiver as claimed in claim 1, wherein the second TV signal blocks have a preferential profile of themes which is defined by a broadcaster or service provider.

7. A TV signal receiver as claimed in claim 5, further comprising a selector for selecting second TV signal blocks stored in the memory in dependent upon the preferential profile presented by the input means.

8. A TV signal receiver as claimed in claim 5, further comprising a further output terminal for supplying the preferential profile.

9. A TV signal receiver as claimed in claim 5, wherein the preferential profile of themes is added to the memory.

10. A TV signal receiver as claimed in claim 5, wherein a second TV signal block with a specific preferential profile is insertable into more than one of said interruption intervals of the first TV signal.

11. A TV signal receiver as claimed in claim 1, wherein the memory is a magnetic record carrier.

12. A TV signal receiver as claimed in claim 11, wherein the magnetic record carrier is a hard disk.

13. A TV signal receiver as claimed in claim 11, wherein the magnetic record carrier is a longitudinal magnetic recording medium.

14. A TV signal receiver as claimed in claim 1, wherein the memory is a solid-state memory.

\* \* \* \* \*